United States Patent [19]

Shultz et al.

[11] 3,934,973

[45] Jan. 27, 1976

[54] FINELY DIVIDED COLORANTS

[75] Inventors: Andrew Shultz, Morris Plains; Leslie C. Wizemann, Wyckoff, both of N.J.

[73] Assignee: Allied Chemical Corporation, New York, N.Y.

[22] Filed: Sept. 20, 1971

[21] Appl. No.: 182,234

Related U.S. Application Data

[63] Continuation of Ser. No. 721,590, April 16, 1968, abandoned.

[52] U.S. Cl. .......................... 8/79; 8/78; 252/132; 252/89
[51] Int. Cl.² ................................ C09B 67/00
[58] Field of Search ................... 8/79; 117/DIG. 7

[56] References Cited
UNITED STATES PATENTS

| | | | |
|---|---|---|---|
| 2,768,054 | 10/1956 | Armento | 8/169 |
| 2,785,478 | 3/1957 | Audas | 8/54.2 |
| 2,844,489 | 7/1958 | Gemmer | 117/21 |
| 2,986,475 | 5/1961 | Mesnard | 117/100 |
| 3,573,979 | 4/1971 | Honjo | 117/234 |

FOREIGN PATENTS OR APPLICATIONS

| | | | |
|---|---|---|---|
| 229,137 | 3/1951 | Australia | 8/1 |
| 703,577 | 2/1965 | Canada | 8/1 |
| 807,089 | 1/1959 | United Kingdom | 8/79 |

OTHER PUBLICATIONS

Bibliography of Solid Adsorbent, 1943 to 1953 by Deitz National Bureau of Standards, Abstracts 1391 and 8225, and 3–8B02.

Glassfone, Textbook of Physical Chemistry, pp. 1218 and 1219, Pub. 1946 by D. Van Nostrand, N.Y.C.

Kivkothmer, Encyclopedia of Chemical Technology, 2nd Edition, Vol. 7, pp. 481 and 487.

*Primary Examiner*—Donald Levy
*Attorney, Agent, or Firm*—Anthony J. Stewart; Jay P. Friedenson

[57] ABSTRACT

Finely divided colorant compositions capable of uniform distribution throughout a dry, solid particulate material, such as a cleaning composition, are prepared by forming a solution of the desired colorant, adding a finely divided, inert substrate material and spray drying the resultant slurry.

10 Claims, No Drawings

FINELY DIVIDED COLORANTS

This is a continuation of application Ser. No. 721,590, filed Apr. 16, 1968, now abandoned, entitled "Finely Divided Colorants."

In the preparation of powdered or granular cleaning compositions such as soaps, detergents, scouring cleansers and the like for the consumer market, the acceptability of these products is often enhanced by the addition of a colorant. In most instances the amount of colorant employed is small. For example, in the preparation of household cleansers to be used on surfaces such as porcelain sinks, toilet bowls, tiles and the like, it has been found desirable to incorporate a water-soluble colorant in relatively low concentrations, so that the colorant is practically imperceptible until the cleanser is applied to a wet surface. Dissolution of the colorant then imparts a color to the wet surface and serves as an indicator of the distribution of cleanser on the surface to be cleaned.

In the preparation of such compositions the colorant is employed in a finely divided state and is uniformly distributed or dispersed throughout the composition in order to minimize the coloration effect in the dry composition. It has been found to be both difficult and expensive to prepare dyes having the desired degree of fineness for such purposes. Furthermore, non-uniform or heterogeneous distribution of the dye results unless care is exercised in the mixing or blending of the dye with the cleaning composition. Additional blending problems result from the tendency of many dyes, especially in finely divided state, to aggregate during the blending operation.

As a result of the formation of aggregates or large easily discernible particles of color, the desired effect of a barely perceptible color is lost. More importantly when large mixes or blends are prepared for subsequent repackaging in smaller units this inhomogeneity resulting from aggregation causes considerable variation of dye content in the smaller units and may result in an excess of dye in some packages and a deficiency or substantial absence in others.

It is an object of the present invention to provide finely divided colorant compositions which can be easily dispersed throughout dry, solid particulate compositions such as the cleaning compositions mentioned above.

It is a further object to provide a method of preparing such colorant compositions.

A still further object of this invention is to provide dry, solid, particulate compositions, and particularly cleaning compositions having a colorant uniformly dispersed therethrough.

The foregoing and other objects and advantages are achieved in accordance with the present invention which provides novel, easily-dispersible colorant compositions and a process for preparing them.

The colorant compositions of the present invention are spray-dried compositions comprising a finely divided, inert substrate material having a dyestuff evenly dispersed thereon.

The process of the present invention comprises admixing a solution of the desired colorant with a finely divided, inert, substrate material, and drying the resultant slurry by atomizing it into a heated gas stream.

Various dyes and mixtures thereof may be employed depending on the color desired and the intended use of the compositions and the medium in which the dye is to be dissolved. Since, the colorant compositions of the present invention find particular utility in cleansing compositions such as soaps, synthetic detergents and the like, normally employed with water, water-soluble dyes are preferred. Also, since such compositions are commonly used in the cleaning of cooking ware, eating utensils and the like, or in contact with the human body, it is particularly desirable that the ingredients of such compositions be non-toxic. Thus, the preferred colorants, for purposes of the present invention are water soluble, non-toxic colorants such as the FD&C and D&C certified colors. Typical of the commercially available dyes which may be employed are:

disodium salt of 4-{(4-[N-ethyl-p-sulfobenzylamino] phenyl) (2-sulfoniumphenyl)methylene} (1-N-ethyl-N-p-sulfobenzyl)- $\Delta^{2,5}$-cyclohexadienimine) (i.e. FD&C Blue No. 1)

monosodium salt of 4-[4-(N-ethyl-p-sulfobenzylamino) diphenylmethylene]-[1-(N-ethyl-N-p-sulfoniumbenzyl)- $\Delta^{2,5}$-cyclohexadienimine] (i.e. FD&C Green No. 1)

trisodium salt of 1-(4-sulfo-1-nephthylazo)-2-naphthol-3,6-disulfonic acid (i.e. FD&C Red No. 2)

monosodium salt of {4- [4-(N-ethyl-p-sulfobenzylamino) phenyl]-[4-(N-ethyl-p-sulfoniumbenzylamino)phenyl]methylene}-(N,N-dimethyl- $\Delta^{2,5}$-cyclohexadienimine) (i.e. FD&C Violet No. 1)

trisodium salt of 3-carboxy-5-hydroxy-1-p-sulfophenyl-4-p-sulfophenylazopyrazole (i.e. FD&C Yellow No. 5)

disodium salt of 1-p-sulfophenylazo-2-naphthol-6-sulfonic acid (i.e. FD&C Yellow No. 6)

disodium salt of 2-(5-sulfo-2,4-xylylazo)-1-naphthol-4-sulfonic acid ( i.e. FD&C Red No. 4)

disodium salt of 8-amino-7-p-nitrophenylazo-2-phenylazo-1-naphthol-3,6-disulfonic acid ( i.e. D&C Black No. 1)

monosodium salt of 4-p-sulfophenylazo-2(2,4-xylylazo)-1,3-resorcinol ( i.e. D&C Brown No. 1)

disodium salt of 1,4-bis(o-sulfo-p-toluino)anthraquinone ( i.e. D&C Green No. 5)

monosodium salt of 1-hydroxy-4-(o-sulfo-p-toluino) anthraquinone (Ext. D&C Violet No. 2)

disodium salt of 4-(o-sulfo-p-tolylazo)-3-hydroxy-2-naphthoic acid ( i.e. D&C Red No. 6)

It will be understood, though, that other water soluble dyes as well as dyes soluble in other media, such as oil, can be used.

The dyestuff can be dissolved in any inert solvent which is sufficiently volatile to be readily removed during the drying step. Because of its low cost and because, as mentioned above, water soluble dyestuffs are preferred, the most appropriate solvent is water, although alcohols, such as methanol, ethanol, propanol, butanol and phenol, aromatic compounds, such as benzene, toluene and xylene, and lower alkanes, such as hexane, heptane and octane can be used. The amount of solvent is not critical, but should be sufficient to dissolve all of the dyestuff and provide a readily pumpable slurry after admixture with the inert substrate.

Suitable inert substrate materials which may be employed include for example, colloidal silica, silica flour, diatomaceous earth, kaolin, pumice, talc, mineral clays, (e.g. bentonite or fullers earth) chalk, kieselguhr, tripoli, powdered feldspar. When the colorant is intended for use in an abrasive composition such as a scouring cleanser, it may be expedient to select a substrate material such as silica or powdered feldspar, which has suitably abrasive properties. However, for use in compositions where abrasive properties are not desired, an essentially non-abrasive substrate material, such as finely powdered magnesium silicate may be selected. The substrate should be insoluble in the dyestuff solution, and for some uses it is preferred that the substrate material also be substantially insoluble in the medium in which the final composition is to be employed. For example, in the case of most scouring compositions, the substrate should be substantially insoluble in water. The substrate should also be inert or non-deleterious with respect to the other ingredients in the composition. Particle size of the substrate material may vary considerably, depending on intended usage, for example, from less than 0.001 to greater than 250 microns diameter. It is preferred to employ a finely divided silica of which at least 50 percent by weight passes through a 200 mesh sieve (U.S. Standard Sieve Series). Essentially such silica is of a particle diameter wherein greater than 50 percent is smaller than 75 microns.

The ratio of components in the present colorant compositions may vary considerably, depending on the depth of color and degree of dispersion desired in the final composition, and the surface area or bulk density of the substrate material. For most purposes compositions comprising about 0.1 to 20 percent by weight of colorant, based on the total weight of colorant plus inert substrate will be suitable.

For the purpose of drying, the composition of the slurry to be dried, that is the ratio of solid to liquid, may vary considerably, provided it is of such consistency that it is pumpable. Satisfactory results are obtained for example with slurries containing about 2 to 20 parts of substrate material per 100 parts of dyestuff solution, although it will be apparent that considerably higher or lower proportions can be employed if desired.

In the preparation of the slurry, the order of addition of materials is not critical. Hence, the dyestuff can be added to a slurry of the inert substrate in the solvent or the inert substrate can be added to the solution of dyestuff in solvent, or the solvent can be added to a mixture of dyestuff and inert material.

The drying of materials by atomization into a heated gas stream, generally referred to as "spray drying", may be effected in various types of commercial spray drying apparatus. A general description of such apparatus is found in Chemical Engineers' Handbook, John H. Perry, third edition (1950) McGraw-Hill Book Company, Inc., pages 838–848. As described therein, atomization is generally accomplished by passing a pumpable fluid through a nozzle or on a high speed rotating disc. The atomized material enters a heated gas stream comprising any gas or mixture of gases which is chemically inert to the material being dried, for example, air, carbon dioxide, nitrogen, etc., which serves to dry the particles as they pass through. In such apparatus the temperature of the gas stream is generally maintained at about 100° to 300° centigrade at the inlet of the atomized material, and the flow rate of the gas stream and retention time of the atomized material are sufficient to effect the drying of the material to a free-flowing particulate state. Usual exit gas temperatures will be about 60° to 160° centigrade. The dried material will generally have a moisture content of less than about 10 percent by weight.

The resultant free flowing colorant composition is a dry, finely-divided, inert substrate material having the dye evenly dispersed thereon. In such compositions, the formation of aggregates of the dye particles is substantially eliminated, and surprisingly an average particle size of dye plus substrate may be obtained that is less than that usually obtained by grinding or pulverizing the dye alone. In general, the average particle size of the colorant composition is dependent on the size of the substrate starting material as well as the conditions during drying. Typical ranges in particle size are indicated by the examples. Mixing and blending of the dye into the final composition, for example, a detergent cleaning composition is greatly simplified. Non-uniform distribution of the dye is minimized and simple mixing procedures may be employed to provide a homogeneous mixture which, when divided into smaller units, for example in consumer packages, will exhibit little or no variation of composition from package to package.

The substrate having the dye dispersed thereon may then be added to the material to be colored in any suitable manner for mixing solids, such as in a tumbler, a ribbon mixer, a screw mixer or a turbine mixer. It has been noted that these dispersed colorant compositions find particular utility in the coloration of powdered cleaning compositions, such as soaps, detergents, scouring cleansers and the like. The dispersed colorant may be added to such compositions in whatever amounts are necessary to obtain the desired degree of color. Typical cleaning compositions will generally comprise, in weight percent, between about 0.005 and 2.0 percent of dye and between about 2 and 20 percent of inert substrate. When low percentages of dye, such as below about 0.05 percent and a finely divided substrate, for example having an average particle size below about 100 microns are employed, compositions may be prepared wherein the color is almost imperceptable. Such compositions will appear substantially white in dry form, but will exhibit color when added to water. If it is desired to prepare a heterogeneous dispersion wherein the colorant appears as distinct particles dispersed, for example, in a powdered soap, detergent or the like, a larger substrate size and a higher ratio of dye to substrate is employed so that the particles are almost completely colored. The colored substrate particles can be dry mixed with powdered or granulated soap or detergent in any ratio desired and will appear as large colored particles in the mix.

The cleaning compositions with which the colorants of the present invention may be advantageously employed include for example, water-soluble alkali metal soaps or any one or mixture of known synthetic detergents either alone or in admixture with various builders such as sodium tripolyphosphate and the like. Typical synthetic detergents are the alkali metal salts of anionic sulfate or sulfonate detergents containing branched or straight chain alkyl groups of 8 to 22 carbon atoms, such as sodium dodecyl benzene sulfonate. Inasmuch as the generally used dyestuffs are acid-type dyes they do not color textiles or other objects objectionably in the alkaline media which result during normal use of the cleaning compositions. Moreover, in laundering and scouring operations, a bleach or oxidizing agent is normally used, either in a separate step or by means of materials incorporated in the cleaning composition. These dyes are decolorized by such treatments and hence have the additional advantage that any remotely possible slight color, which may be imparted to articles with which the cleaning compositions may come in contact during use, is removed substantially completely due to the neutralizing action of the media and/or the bleaching action.

Scouring compositions with which the colorants of the present invention may be employed generally contain a relatively large amount of mild abrasive such as quartz flour, pumice and the like, together with a relatively small amount of synthetic detergent and optionally, minor amounts of inorganic salts and/or solid bleaching compounds, such as alkali perborates, percarbonates, etc. In the application of the colorants to these scouring compositions it has been found expedient to utilize a portion or all of the abrasive component of the scouring composition as the inert substrate to which the dye is applied in accordance with the present invention.

By way of further illustration of the present invention and the manner in which it may be practiced the following specific examples are set forth. In the examples, all parts are by weight and all temperaatures are in centigrade degrees unless otherwise indicated.

EXAMPLE 1

Fifty parts of colloidal silica having an average particle size of 0.015—0.020 $\mu$, was mixed with 1000 parts of water to form a uniform suspension. To the suspension 1.0 parts of FD&C Blue No. 1 dye was added and the mixture was agitated until all the dye was dissolved. The mixture was then dried using a Technicum Spray Dryer, with a Bowen Spin Disc speed of about 35,000–40,000 r.p.m. Inlet temperature was 145°–150°C and exhaust temperature was 60°–70°C. The resultant spray dried product which consisted of colloidal silica having the dye dispersed thereon was subjected to a screen analysis using U.S. Standard Sieve Series. The results of the screen analysis are shown in the table below.

EXAMPLES 2 – 9

In Examples 2–6, the procedure of Example 1 was repeated except that the amount of dye was varied as shown in the table. In Example 7, the procedure of Example 1 was repeated using 50 parts dyestuff but no silica. Examples 8 and 9 show the screen analysis of the starting materials — not spray dried — and are included in the table for purpose of comparison.

tended to form aggregates during drying and the average particle size tended to increase. In the other example where the substrate material is present, the dye is dispersed on the surface of the substrate and aggregation is prevented. Furthermore it will be apparent from a comparison of Example 6 with Example 8 that the spraydrying reduces the average particle size of the colloidal silica with the result that a greater percentage of the spraydried substrate will pass through a 200 mesh screen. In addition, contrary to expectations, it is seen that increased percentages of dye with a fixed quantity of substrate do not result in an average particle size increase. On the contrary, a trend toward decreasing average particle size with increasing percentages of dye is noted.

We claim:

1. A process for preparing a finely-divided, easily dispersible colorant composition which comprises preparing a slurry of a substrate consisting essentially of a finely-divided, inert, water-insoluble inorganic material in a solution of a dyestuff, removing the solvent from said slurry by atomizing said slurry into a stream of heated gas and recovering the resulting dried product as a free-flowing particulate composition of said inert substrate having said dyestuff evenly dispersed on the surface thereof.

2. The process of claim 1 wherein the solution of dyestuff is an aqueous solution.

3. The process of claim 1 wherein the slurry comprises about 2 to 20 parts of substrate material per 100 parts of dyestuff solution.

4. The process of claim 1 wherein the dyestuff is a non-toxic, water soluble dyestuff.

5. The process of claim 1 wherein the amount of dyestuff in said solution is about 0.1 to 20% by weight based on the total weight of the dyestuff and the substrate.

6. The process of claim 1 wherein the substrate material has a particle size ranging from about 0.001 to about 250 microns in diameter.

7. The process of claim 1 wherein the temperature of the heated gas is about 100° to 300°C.

8. A spray-dried, free-flowing, finely-divided colorant composition comprising a substrate having a dyestuff evenly dispersed on the surface thereof, said substrate consisting essentially of a finely-divided inert water-insoluble inorganic material.

9. The composition of claim 8 wherein the dyestuff is

TABLE

| Example No. | 1 | 2 | 3 | 4 | 5 | 6 | 7 | 8 | 9 |
|---|---|---|---|---|---|---|---|---|---|
| | | | Parts By Weight | | | | | (Not Spray-Dried) | |
| Colloidal Silica* | 50 | 50 | 50 | 50 | 50 | 50 | — | 50 | — |
| FD&C Blue No. 1 | 0.5 | 1.0 | 2.0 | 4.0 | 10.0 | — | 50 | — | 50 |
| Screen Analysis:** | | | | | | | | | |
| Retained on 80 mesh | 24.66 | 8.34 | 7.27 | 3.77 | 0.7 | 0.18 | 95.19 | 5.45 | 48.86 |
| " 100 " | 12.27 | 7.88 | 8.24 | 8.02 | 0.66 | 0.26 | 3.66 | 12.33 | 31.42 |
| " 200 " | 36.33 | 21.59 | 24.77 | 22.40 | 14.61 | 7.36 | 0.40 | 48.20 | 13.36 |
| Passed through 200 Mesh | 26.74 | 62.19 | 59.51 | 65.81 | 84.03 | 92.20 | 0.75 | 34.02 | 6.39 |

*CaB-O-Sil M-5; Cabot Corp., Boston, Mass.
**U.S. Standard Sieve Series.

One of the advantages of the present invention is apparent from the screen analyses shown in the above examples. Example 7 shows the screen analysis of a dye which was spray-dried without a substrate material. By comparison with the analysis of the material before spray drying, (Example 9) it will be seen that the dye a water soluble dyestuff.

10. A dry, solid particulate colored composition comprising a cleansing composition having uniformly dispersed therethrough a colorant composition as claimed in claim 9.

* * * * *